(12) United States Patent
Zhang et al.

(10) Patent No.: US 8,174,217 B2
(45) Date of Patent: May 8, 2012

(54) SENSORLESS CONTROL APPARATUS AND METHOD FOR INDUCTION MOTOR

(75) Inventors: Yu Zhang, Shnghai (CN); Cheng Lu, Shanghai (CN); Jian-Ping Ying, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 1014 days.

(21) Appl. No.: 12/128,806

(22) Filed: May 29, 2008

(65) Prior Publication Data

US 2009/0160394 A1 Jun. 25, 2009

(30) Foreign Application Priority Data

Dec. 24, 2007 (TW) ................................ 96149794 A

(51) Int. Cl.
*H02P 21/00* (2006.01)
*H02P 21/14* (2006.01)
(52) U.S. Cl. .......... 318/400.02; 318/400.01; 318/400.32
(58) Field of Classification Search .................. 318/727, 318/400.01, 400.02, 400.32, 400.34, 801, 318/798, 799, 432, 400.15, 700
See application file for complete search history.

(56) References Cited

U.S. PATENT DOCUMENTS

| | | | |
|---|---|---|---|
| 6,281,656 B1 * | 8/2001 | Masaki et al. | 318/700 |
| 6,396,229 B1 * | 5/2002 | Sakamoto et al. | 318/400.02 |
| 6,598,008 B2 * | 7/2003 | Lee | 702/147 |
| 6,650,081 B2 * | 11/2003 | Iwaji et al. | 318/700 |
| 6,690,137 B2 * | 2/2004 | Iwaji et al. | 318/700 |
| 6,850,030 B2 * | 2/2005 | Kaku et al. | 318/727 |
| 6,856,109 B2 * | 2/2005 | Ho | 318/400.02 |
| 6,933,701 B2 * | 8/2005 | Kinpara et al. | 318/700 |
| 6,979,967 B2 * | 12/2005 | Ho | 318/400.02 |
| 7,075,266 B2 * | 7/2006 | Tobari et al. | 318/400.02 |
| 7,348,749 B2 * | 3/2008 | Ide et al. | 318/599 |
| 7,388,341 B2 * | 6/2008 | Tobari et al. | 318/400.07 |
| 7,423,395 B2 * | 9/2008 | Iura et al. | 318/400.02 |
| 7,443,127 B2 * | 10/2008 | Okazaki et al. | 318/722 |
| 7,514,896 B2 * | 4/2009 | Imura et al. | 318/718 |
| 7,816,876 B2 * | 10/2010 | Tomigashi | 318/400.02 |
| 7,911,165 B2 * | 3/2011 | Peyras et al. | 318/400.02 |
| 2009/0140674 A1 * | 6/2009 | Nakatsugawa et al. | 318/400.02 |
| 2009/0261774 A1 * | 10/2009 | Yuuki et al. | 318/720 |

(Continued)

OTHER PUBLICATIONS

"A Filtered Back EMF Based Speed Sensorless Induction Motor Drive," C. Nitayotan and S. Sangwongwanich, Proceeding of IEEE-IAS Annu. Meeting, Chicago, IL, 2001, pp. 1224-1231.

(Continued)

*Primary Examiner* — Eduardo Colon Santana
(74) *Attorney, Agent, or Firm* — Volpe and Koenig, P.C.

(57) ABSTRACT

A control apparatus for an induction motor is provided and includes a rotating-speed locked loop and a feed-forward magnetizing-axis angular position emulator. The rotating-speed locked loop emulates a speed control loop of the induction motor for producing an emulated torque current and an emulated rotor angular speed. The feed-forward magnetizing-axis angular position emulator receives the emulated torque current and the emulated rotor angular speed for producing a feed-forward estimated magnetizing-axis angular position, wherein according to the feed-forward estimated magnetizing-axis angular position, a first voltage controlling the induction motor is transformed from a synchronous reference coordinate system of the induction motor to a static reference coordinate system of the induction motor, and a two-phase current detected from the induction motor is transformed from the static reference coordinate system to the synchronous reference coordinate system. The state the stator angular frequency is at zero can be skipped through the apparatus.

20 Claims, 9 Drawing Sheets

U.S. PATENT DOCUMENTS

2010/0277114 A1* 11/2010 Chen et al. .................... 318/573

OTHER PUBLICATIONS

"A Speed-Sensorless IM Drive With Decoupling Control and Stability Analysis of Speed Estimation," S. Suwankawin and S. Sangwongwanich, IEEE Trans. Ind. Electron., vol. 49, No. 2, Mar./Apr. 2002, pp. 444-455.

"Speed Sensorless Control of Induction Motors At Very Low Stator Frequencies," M. Depenbrock, C. Foerth, and S. Koch, the 8th European Power Electronics Conf. (EPE), Lausanne, Switzerland, 1999.

"Regenerating-Mode Low-Speed Operation of Sensorless Induction Motor Drive With Adaptive Observer," Hisao Kubota, Ikuya Sato, Yuichi Tamura, Kouki Matsuse, Hisayoshi Ohta, and Yoichi Hori, IEEE Transactions on Industry Applications, vol. 38, No. 4, Jul./Aug. 2002, pp. 1081-1086.

* cited by examiner

SENSORLESS CONTROL APPARATUS AND METHOD FOR INDUCTION MOTOR

FIELD OF THE INVENTION

The present invention relates to a sensorless control apparatus and method for an induction motor, and more particularly to a vector control apparatus and method for a speed-sensorless induction motor.

BACKGROUND OF THE INVENTION

Speed or torque control performance and accuracy of induction motors are improved with a speed-sensorless vector control method for some restricted environment setting a speed sensor in order to reduce the cost or to simplify the wiring. Generally, the speed feedback of the conventional method is produced by some kind of speed-adaptive flux observers, which are introduced by:

Document 1: C. Nitayotan and S. Sangwongwanich, "A Filtered Back EMF Based Speed Sensorless Induction Motor Drive," Proceeding of IEEE-IAS Annu. Meeting, Chicago, Ill., 2001, pp. 1224-1231; and Document 2: S. Suwankawin and S. Sangwongwanich, "A Speed-Sensorless IM Drive With Decoupling Control and Stability Analysis of Speed Estimation," IEEE Trans. Ind. Electron., vol. 49, no. 2, March/April 2002, pp. 444-55.

Please refer to FIG. 1, which is a schematic diagram showing a conventional vector control system for a speed-sensorless induction motor. As shown, the vector control system 10 includes a power supply unit 113, an inverter 102, an induction motor 101, a current detection unit 103, a three/two-phase transformation unit 105, a two/three-phase transformation unit 104, a speed-adaptive magnetic flux observer 108, a static/synchronous conversion unit 107, a speed controller 112, a magnetic flux controller 111, a current controller 109, a current controller 110, and a synchronous/static conversion unit 106.

The power supply unit 113 provides a DC bus voltage to the inverter 102. The inverter 102 receives a three-phase control voltage $\vec{u}_{s3\_1}$ and the DC bus voltage and uses the three-phase control voltage $\vec{u}_{s3\_1}$ to control the DC bus voltage for driving the induction motor 101 coupled to the inverter 102. The current detection unit 103 detects a three-phase stator current of the stator of the induction motor 101 and produces a three-phase detected current $\vec{i}_{s3\_1}$. The three/two-phase transformation unit 105 receives the three-phase detected current $\vec{i}_{s3\_1}$ and transforms the three-phase detected current $\vec{i}_{s3\_1}$ into a two-phase current $\vec{i}_{s\_1}$ under a static reference coordinate system of the induction motor 101. The two/three-phase transformation unit 104 receives a two-phase voltage $\vec{u}_{s\_1}$ and transforms the two-phase voltage $\vec{u}_{s\_1}$ into the three-phase control voltage $\vec{u}_{s3\_1}$ under the static reference coordinate system, wherein the three-phase control voltage $\vec{u}_{s3\_1}$ is provided to the inverter 102. The speed-adaptive magnetic flux observer 108 receives the two-phase current $\vec{i}_{s\_1}$ and the two-phase voltage $\vec{u}_{s\_1}$ and produces an estimated rotor angular speed $\hat{\omega}_{r\_1}$, an estimated magnetizing current $\hat{i}_{m\_1}$, and an estimated magnetizing-axis angular position $\hat{\theta}_{m\_1}$, of the estimated magnetizing current $\hat{i}_{m\_1}$, which are estimated properties of the induction motor 101.

The static/synchronous conversion unit 107 receives the two-phase current $\vec{i}_{s\_1}$ and the estimated magnetizing-axis angular position $\hat{\theta}_{m\_1}$ and converts the two-phase current $\vec{i}_{s\_1}$ under the static reference coordinate system into both a q-axis current (torque current) $i_{sq\_1}$ and a d-axis current (magnetizing-axis current) $i_{sd\_1}$ under a synchronous reference coordinate system of the induction motor 101 according to the estimated magnetizing-axis angular position $\hat{\theta}m_{\_1}$. The speed controller 112 receives a rotor angular speed command $\omega_{r\_1}^*$ and the estimated rotor angular speed $\hat{\omega}_{r\_1}$ and matches the rotor angular speed command $\omega_{r\_1}^*$ with the estimated rotor angular speed $\hat{\omega}_{r\_1}$ for producing a torque current command $i_{sq\_1}^*$. The magnetic flux controller 111 receives a magnetizing current command $i_{m\_1}^*$ and the estimated magnetizing current $\hat{i}_{m\_1}$ and matches the magnetizing current command $i_{m\_1}^*$ with the estimated magnetizing current $\hat{i}_{m\_1}$ for producing a magnetizing-axis current command $i_{sd\_1}^*$.

The current controller 109 receives the torque current command $i_{sq\_1}^*$ and the torque current $i_{sq\_1}$ and matches the torque current command $i_{sq\_1}^*$ with the torque current $i_{sq\_1}$ for producing a torque-axis voltage command $u^*_{sq\_1}$. The current controller 110 receives the magnetizing-axis current command $i_{sd\_1}^*$ and the magnetizing-axis current $i_{sd\_1}$ and matches the magnetizing-axis current command $i_{sd\_1}^*$ with the magnetizing-axis current $i_{sd\_1}$ for producing a magnetizing-axis voltage command $u_{sd\_1}^*$.

The synchronous/static conversion unit 106 receives the estimated magnetizing-axis angular position $\hat{\theta}_{m\_1}$ and both the torque-axis voltage command $u_{sq\_1}^*$ and the magnetizing-axis voltage command $u_{sd\_1}^*$ under the synchronous reference coordinate system and converts both the torque-axis voltage command $u_{sq\_1}^*$ and the magnetizing-axis voltage command $u_{sd\_1}^*$ into the two-phase voltage $\vec{u}_{s\_1}$ under the static reference coordinate system. It is noted that the estimated magnetizing-axis angular position $\hat{\theta}m_{\_1}$ received by both the static/synchronous conversion unit 107 and the synchronous/static conversion unit 106 is fed back from the speed-adaptive magnetic flux observer 108.

Please refer to FIG. 2, which is a schematic diagram showing an equivalent circuit of the induction motor. The denoting meanings of respective symbols are shown as follows.

| | |
|---|---|
| $\bar{u}_s$: stator input voltage | $\bar{i}_s$: stator current |
| $R_s$: stator-winding resistance | |
| $L_\sigma$: stator-winding leakage inductance | |
| $\omega_1$: synchronous angular frequency of the stator rotating magnetic field (stator angular frequency) | |
| $L_m$: magnetizing inductance | $\bar{i}_m$: magnetizing current |
| $\bar{e}_m$: induced voltage (back-EMF) | $\omega_r$: rotor angular speed |
| $R_s$: rotor resistance | $\bar{i}_r$: rotor current |

Please refer to FIG. 3, which is a schematic diagram showing a mechanical model of the induction motor. The denoting meanings of respective symbols are shown as follows.

$T_e$: electromagnetic torque of the motor
$T_L$: load torque of the motor
J: rotational inertia of the mechanical load
$\omega_r$: rotor angular speed The angular position of the magnetizing flux or current of the induction motor may be calculated according to the above-mentioned documents by Equation 1.

$$\hat{\theta}_m = \int \omega_1 dt \qquad \text{Equation 1}$$

wherein $\omega_1$ is the stator angular frequency, which can be calculated by Equation 2.

$$\omega_1 = \hat{\omega}_r + \omega_{slip} \qquad \text{Equation 2}$$

wherein $\hat{\omega}_r$ is the estimated rotor angular speed of the induction motor, and the slip $\omega_{slip}$ may be calculated by Equation 3.

$$\omega_{slip} = \frac{1}{T_r} \cdot \frac{\hat{i}_{sq}}{\hat{i}_m}$$ Equation 3 wherein $$T_r = \frac{L_m}{R_r}$$

is the rotor time constant, and $$\hat{i}_{sq} = \frac{i_{s\beta}\hat{i}_{m\alpha} - i_{s\alpha}\hat{i}_{m\beta}}{\hat{i}_m}$$

is the estimated torque current.

In the computation formula of the estimated torque current $\hat{i}_{sq}$, $\hat{i}_m$ is the amplitude of the estimated magnetizing current, $\hat{i}_{m\alpha}$, $\hat{i}_{m\beta}$ are the orthogonal two-axis components of the estimated magnetizing current $\hat{i}_m$ under the two-phase static reference coordinate system, and $\hat{i}_{m\alpha}$, $\hat{i}_{m\beta}$ are the orthogonal two-axis components of the stator current under the two-phase static reference coordinate system. In Equation 3, the estimated torque current $\hat{i}_{sq}$ may also be replaced with the real torque current $i_{sq}$, and the estimated magnetizing current $\hat{i}_m$ may also be replaced with the magnetizing current command $\hat{i}_m$.

The speed-adaptive magnetic flux observers presented in the above documents are based on the fundamental model of the induction motor. When the magnitude of the stator angular frequency is less than a minimum of a positive angular frequency around zero angular frequency, it is impossible to estimate the motor speed. In order to avoid working in the above-mentioned range of the very low stator angular frequency, a flux-weakening method is presented by:

Document 3: M. Depenbrock, C. Foerth, and S. Koch, "Speed Sensorless Control Of Induction Motors At Very Low Stator Frequencies," The 8th European Power Electronics Conf. (EPE), Lausanne, Switzerland, 1999; and Document 4: Hisao Kubota, Ik-uya Sato, Yuichi Tamura, Kouki Matsuse, Hisayoshi Ohta, and Yoichi Hori, "Regenerating-Mode Low-Speed Operation of Sensorless Induction Motor Drive With Adaptive Observer," IEEE Transactions on Industry Applications, Vol. 38, No. 4, July/August 2002, pp. 1081-1086.

The flux-weakening method used in the Documents 3 and 4 increases the slip in order to avoid operating around zero angular frequency. However, the flux weakening will decrease the load capability, so that the flux-weakening method is not applicable for some heavy-load application. Furthermore, for some motor with a very small slip, the stator angular frequency can be hardly increased any more. So for general consideration, the stator angular frequency should be limited to be greater than a minimum angular frequency in order to avoid operating around zero angular frequency.

If the stator angular frequency is limited to be greater than a minimum angular frequency, it can be seen from Equation 2 that if only the stator frequency is limited in FIG. 1, Equation 3 cannot be guaranteed; that is, Equation 3 is prohibited according to the vector control principles of the induction motor. Therefore, how to make the stator angular frequency, responding to the load and speed reference variation, be close to that of the conventional vector control system shown in FIG. 1 and how to skip zero stator angular frequency become the primary motive of the present invention.

SUMMARY OF THE INVENTION

It is an object of the present invention to provide a sensorless control apparatus and method for an induction motor. A feed-forward stator angular frequency command provided by the apparatus and method may be limited to be greater than a minimum angular frequency in order to skip zero stator angular frequency.

It is therefore an aspect of the present invention to provide the sensorless control apparatus for the induction motor. The apparatus includes a rotating-speed locked loop and a feed-forward magnetizing-axis angular position emulator. The rotating-speed locked loop receives a rotor angular speed command and an estimated electromagnetic torque of the induction motor and emulates a speed control loop of the induction motor for producing an emulated torque current and an emulated rotor angular speed. The feed-forward magnetizing-axis angular position emulator receives the emulated torque current, the emulated rotor angular speed and an estimated magnetizing current of the induction motor and estimates an emulated slip of the induction motor for producing a feed-forward stator angular frequency command and a feed-forward estimated magnetizing-axis angular position, wherein according to the feed-forward estimated magnetizing-axis angular position, a first voltage controlling the induction motor is transformed from a synchronous reference coordinate system of the induction motor to a static reference coordinate system of the induction motor, and a two-phase current detected from the induction motor is transformed from the static reference coordinate system to the synchronous reference coordinate system.

It is therefore another aspect of the present invention to provide the sensorless control method for the induction motor. The method includes the following steps. An emulated torque current and an emulated rotor angular speed are produced based on a rotor angular speed command, an estimated electromagnetic torque of the induction motor, and an emulation of a speed control loop of the induction motor. A feed-forward stator angular frequency command and a feed-forward estimated magnetizing-axis angular position are produced based on the emulated torque current, the emulated rotor angular speed, an estimated magnetizing current of the induction motor, and an estimation of an emulated slip of the induction motor, wherein according to the feed-forward estimated magnetizing-axis angular position, a first voltage controlling the induction motor is transformed from a synchronous reference coordinate system of the induction motor to a static reference coordinate system of the induction motor, and a two-phase current detected from the induction motor is transformed from the static reference coordinate system to the synchronous reference coordinate system.

BRIEF DESCRIPTION OF THE DRAWINGS

The foregoing and other features and advantages of the present invention will be more clearly understood through the following descriptions with reference to the drawings, wherein.

DETAIL DESCRIPTION OF THE PREFERRED EMBODIMENT

Figure 4:
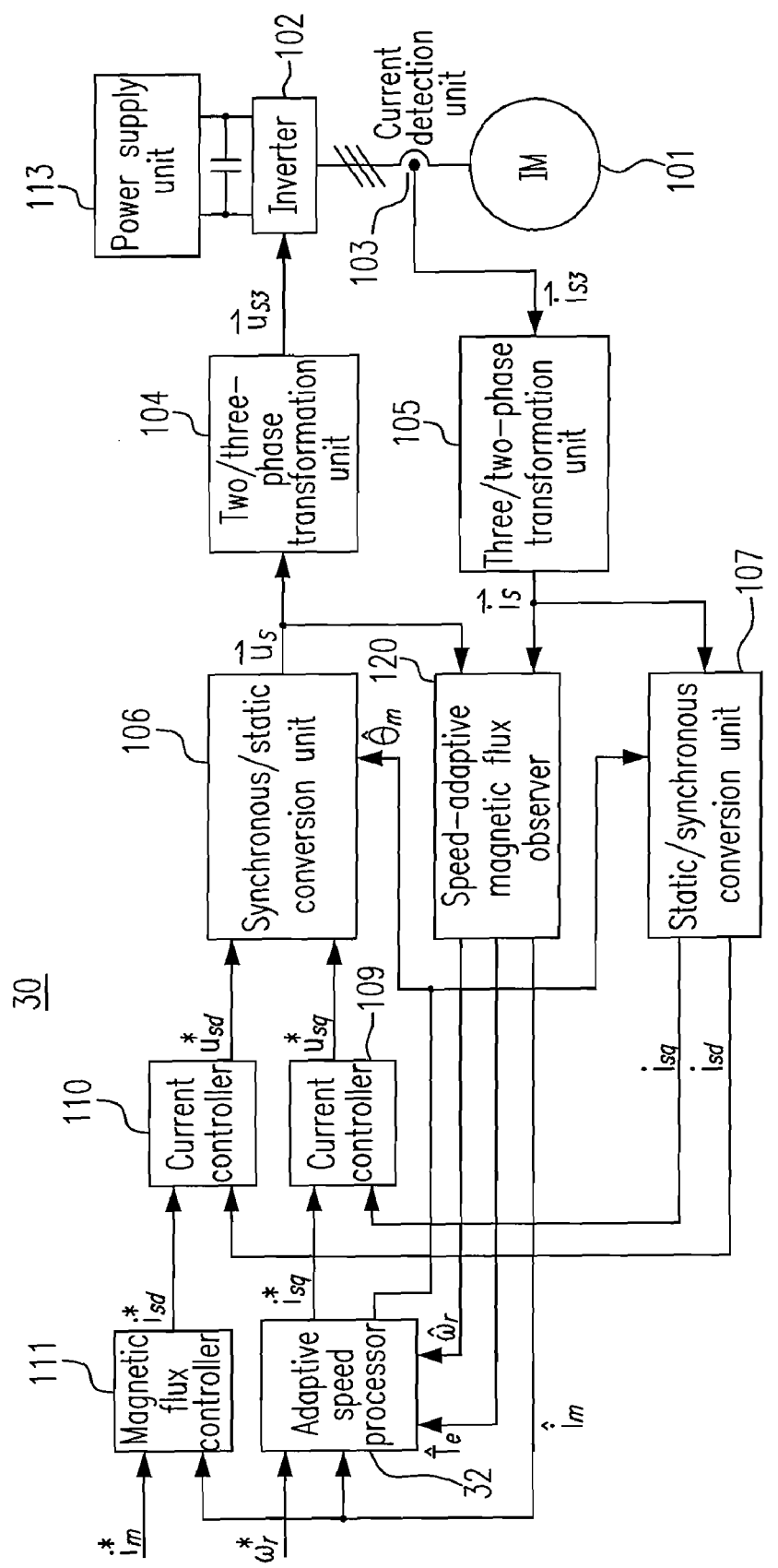
FIG. 4 is a schematic diagram showing a sensorless control system for the induction motor according to the first embodiment of the present invention.

Please refer to FIG. 4, which is a schematic diagram showing a sensorless control system for the induction motor according to the first embodiment of the present invention. As shown, the sensorless control system 30 includes the power supply unit 113, the inverter 102, the induction motor 101, the current detection unit 103, the three/two-phase transformation unit 105, the two/three-phase transformation unit 104, a speed-adaptive magnetic flux observer 120, the magnetic flux controller 111, an adaptive speed processor 32, the static/synchronous conversion unit 107, the current controller 109, the current controller 110, and the synchronous/static conversion unit 106.

The power supply unit 113 provides a DC bus voltage to the inverter 102. The inverter 102 receives a three-phase control voltage $\vec{U}_{s3}$ and the DC bus voltage and uses the three-phase control voltage $\vec{u}_{s3}$ to control the DC bus voltage for driving the induction motor 101 coupled to the inverter 102. The current detection unit 103 detects a three-phase stator current of the stator of the induction motor 101 and produces a three-phase detected current $\vec{i}_{s3}$. The three/two-phase transformation unit 105 receives the three-phase detected current $\vec{i}_{s3}$ and transforms the three-phase detected current $\vec{i}_{s3}$ into a two-phase current $\vec{i}_s$ under a static reference coordinate system of the induction motor 101. The two/three-phase transformation unit 104 receives a two-phase voltage $\vec{i}_s$ and transforms the two-phase voltage $\vec{i}_s$ into the three-phase control voltage $\vec{i}_{s3}$ under the static reference coordinate system, wherein the three-phase control voltage $\vec{i}_{s3}$ is provided to the inverter 102. The speed-adaptive magnetic flux observer 120 receives the two-phase current $\vec{i}_s$ and the two-phase voltage $\vec{u}_s$ and produces an estimated rotor angular speed $\hat{\omega}_r$, an estimated magnetizing current $\hat{i}_m$ and an estimated electromagnetic torque $\hat{T}_e$, which are estimated properties of the induction motor 101.

The magnetic flux controller 111 receives a magnetizing current command $i_m^*$ and the estimated magnetizing current $\hat{i}_m$ and matches the magnetizing current command $i_m^*$ with the estimated magnetizing current $\hat{i}_m$ for producing a magnetizing-axis current command $i_{sd}^*$. The adaptive speed processor 32 receives a rotor angular speed command $\omega_r^*$ the estimated rotor angular speed $\hat{\omega}_r$, the estimated magnetizing current $\hat{i}_m$, and the estimated electromagnetic torque $\hat{T}_e$ for producing a feed-forward estimated magnetizing-axis angular position $\hat{\theta}_m$ and a torque current command $i_{sq}^*$. If slower speed response of the control system 30 can be accepted, the adaptive speed processor 32 may produce the feed-forward estimated magnetizing-axis angular position $\hat{\theta}_m$ of the magnetizing flux only according to the rotor angular speed command $\omega_r^*$, the estimated magnetizing current $\hat{i}_m$ and the estimated electromagnetic torque $\hat{T}_e$, wherein the estimated rotor angular speed $\hat{\omega}_r$ is assumed to be zero.

The static/synchronous conversion unit 107 receives the two-phase current $\vec{i}_s$ and the feed-forward estimated magnetizing-axis angular position $\hat{\theta}_m$ and converts the two-phase current $\vec{i}_s$ under the static reference coordinate system into both a q-axis current (torque current) $i_{sq}$ and a d-axis current (magnetizing-axis current) $i_{sd}$ under a synchronous reference coordinate system of the induction motor 101 according to the feed-forward estimated magnetizing-axis angular position $\hat{\theta}_m$ and a static/synchronous coordinate transformation function between the static and the synchronous reference coordinate systems. The current controller 110 receives the magnetizing-axis current command $i_{sd}^*$ and the magnetizing-axis current $i_{sd}$ and matches the magnetizing-axis current command $i_{sd}^*$ with the magnetizing-axis current $i_{sd}$ for producing a magnetizing-axis voltage command $u_{sd}^*$. The current controller 109 receives the torque current command $i_{sq}^*$ and the torque current $i_{sq}$ and matches the torque current command $i_{sq}^*$ with the torque current $i_{sq}$ for producing a torque-axis voltage command $u_{sq}^*$.

The synchronous/static conversion unit 106 receives the feed-forward estimated magnetizing-axis angular position $\hat{\theta}_m$ and both the torque-axis voltage command $u_{sq}^*$ and the magnetizing-axis voltage command $u_{sd}^*$ under the synchronous reference coordinate system and converts both the torque-axis voltage command $u_{sq}^*$ and the magnetizing-axis voltage command $u_{sd}^*$ into the two-phase voltage $\vec{u}_s$ under the static reference coordinate system according to the feed-forward estimated magnetizing-axis angular position $\hat{\theta}_m$ and a synchronous/static coordinate transformation function between the synchronous and the static reference coordinate systems, wherein the torque-axis voltage command $u_{sq}^*$ and the magnetizing-axis voltage command $u_{sd}^*$ may be grouped and named as a first voltage controlling the induction motor 101. It is noted that the feed-forward estimated magnetizing-axis angular position $\hat{\theta}_m$ received by both the static/synchronous conversion unit 107 and the synchronous/static conversion unit 106 is fed forward from the adaptive speed processor 32.

Figure 5:
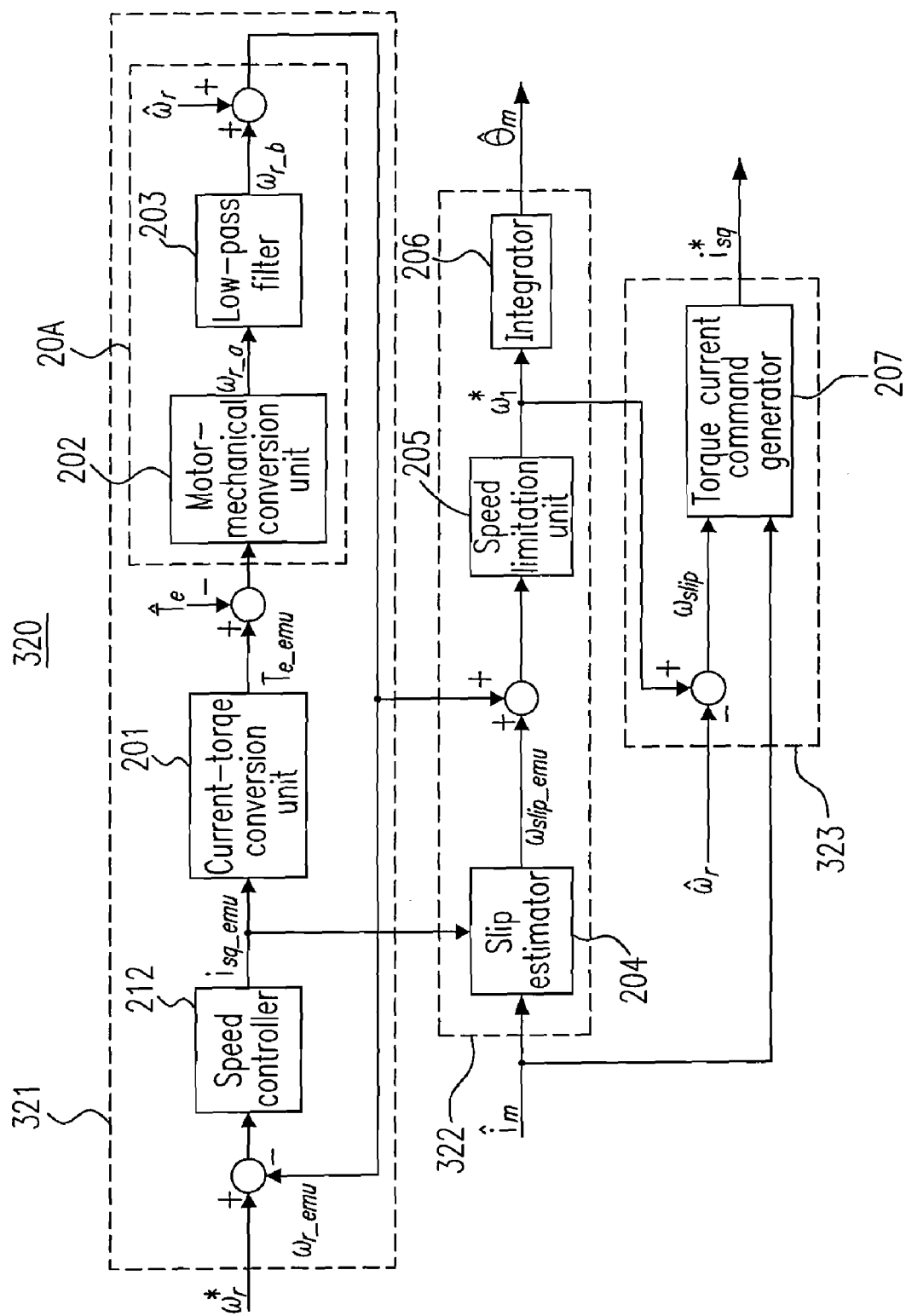
FIG. 5 is a schematic diagram showing an adaptive speed processor according to the first embodiment of the present invention.

Please refer to FIG. 5, which is a schematic diagram showing an adaptive speed processor according to the first embodiment of the present invention. As shown, the adaptive speed processor 320 includes a rotating-speed locked loop 321, a feed-forward magnetizing-axis angular position emulator 322 and a torque current command calculator 323. The rotating-speed locked loop 321 receives the rotor angular speed command $\omega_r^*$ and the estimated electromagnetic torque $\hat{T}_e$, selectively receives the estimated rotor angular speed $\hat{\omega}_r$, and emulates a speed control loop of the induction motor 101 for producing an emulated torque current $i_{sq\_emu}$ and an emulated rotor angular speed $\omega_{r\_emu}$. The feed-forward magnetizing-axis angular position emulator 322 receives the estimated magnetizing current $\hat{i}_m$, the emulated torque current $i_{sq\_emu}$, and the emulated rotor angular speed $\omega_{r\_emu}$ for producing a feed-forward stator angular frequency command $\omega_1^*$ and a feed-forward estimated magnetizing-axis angular position $\hat{\theta}_m$, wherein the feed-forward estimated magnetizing-axis angular position $\hat{\theta}_m$ is obtained according to Equations 1 to 3 of the prior art. The torque current command calculator 323 receives the estimated magnetizing current $\hat{i}_m$, the estimated rotor angular speed $\hat{\omega}_r$, and the feed-forward stator angular frequency command $\omega_1^*$ for producing the torque current command $i_{sq}^*$.

Figure 1:
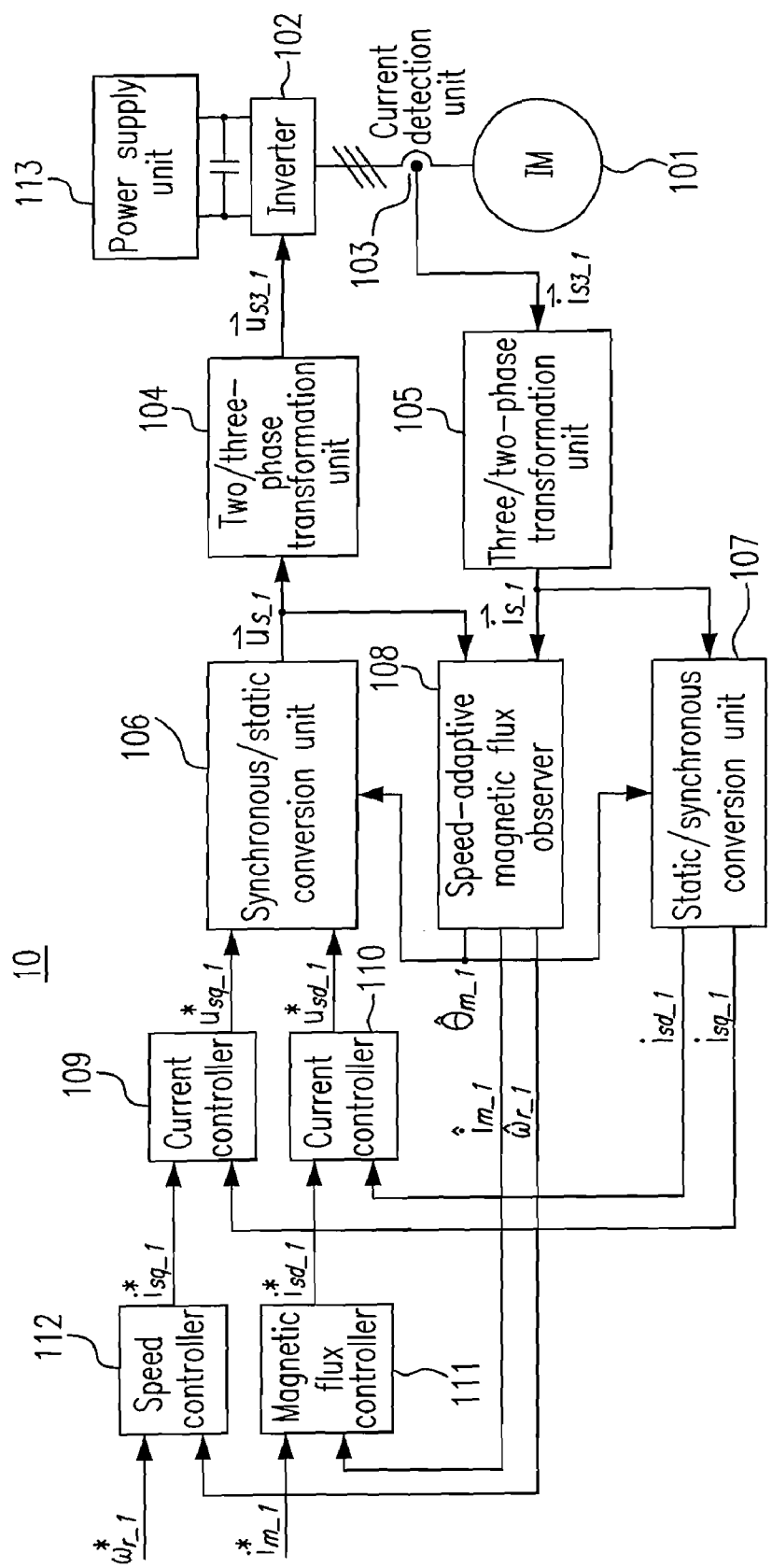
FIG. 1 is a schematic diagram showing a conventional vector control system for a speed-sensorless induction motor.
Figure 2:
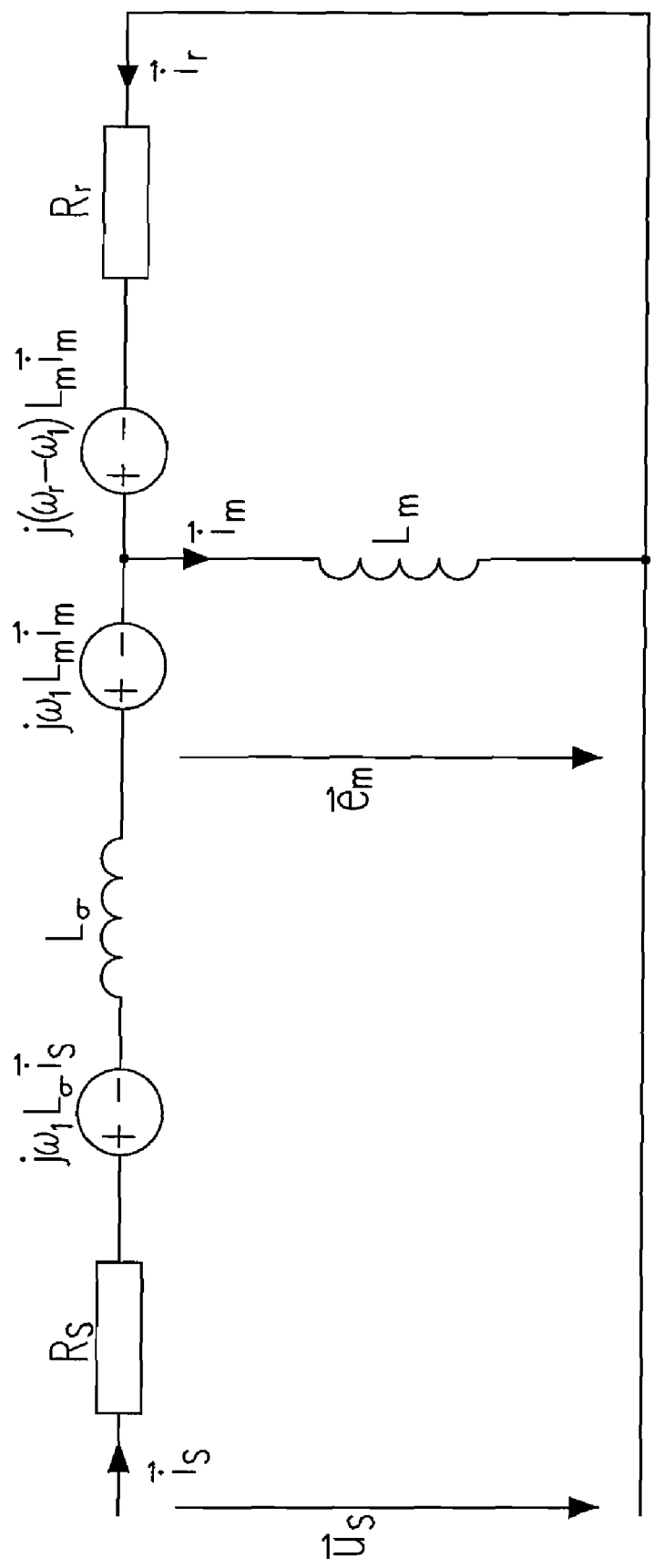
FIG. 2 is a schematic diagram showing an equivalent circuit of the induction motor.

The rotating-speed locked loop 321 includes a speed controller 212, a current-torque conversion unit 201, and a torque-speed conversion unit 20A. The speed controller 212 receives an angular speed difference between the rotor angular speed command $\omega_r^*$ and the emulated rotor angular speed $\omega_{r\_emu}$ and matches the rotor angular speed command $\omega_r^*$ with the emulated rotor angular speed $\omega_{r\_emu}$ for producing the emulated torque current $i_{sq\_emu}$. The current-torque conversion unit 201 receives the emulated torque current $i_{sq\_emu}$ and produces an emulated electromagnetic torque $T_{e\_emu}$ based on a current-to-torque transfer function of the induction motor 101, i.e., based on emulating a transfer function between the torque current command and the electromagnetic torque of the control system 10 in FIG. 1. The torque-speed conversion unit 20A receives a torque difference between the emulated electromagnetic torque $T_{e\_emu}$ and the estimated electromagnetic torque $\hat{T}_e$ and selectively receives the estimated rotor angular speed $\hat{\omega}_r$, for producing the emulated rotor angular speed $\omega_{r\_emu}$.

Figure 3:
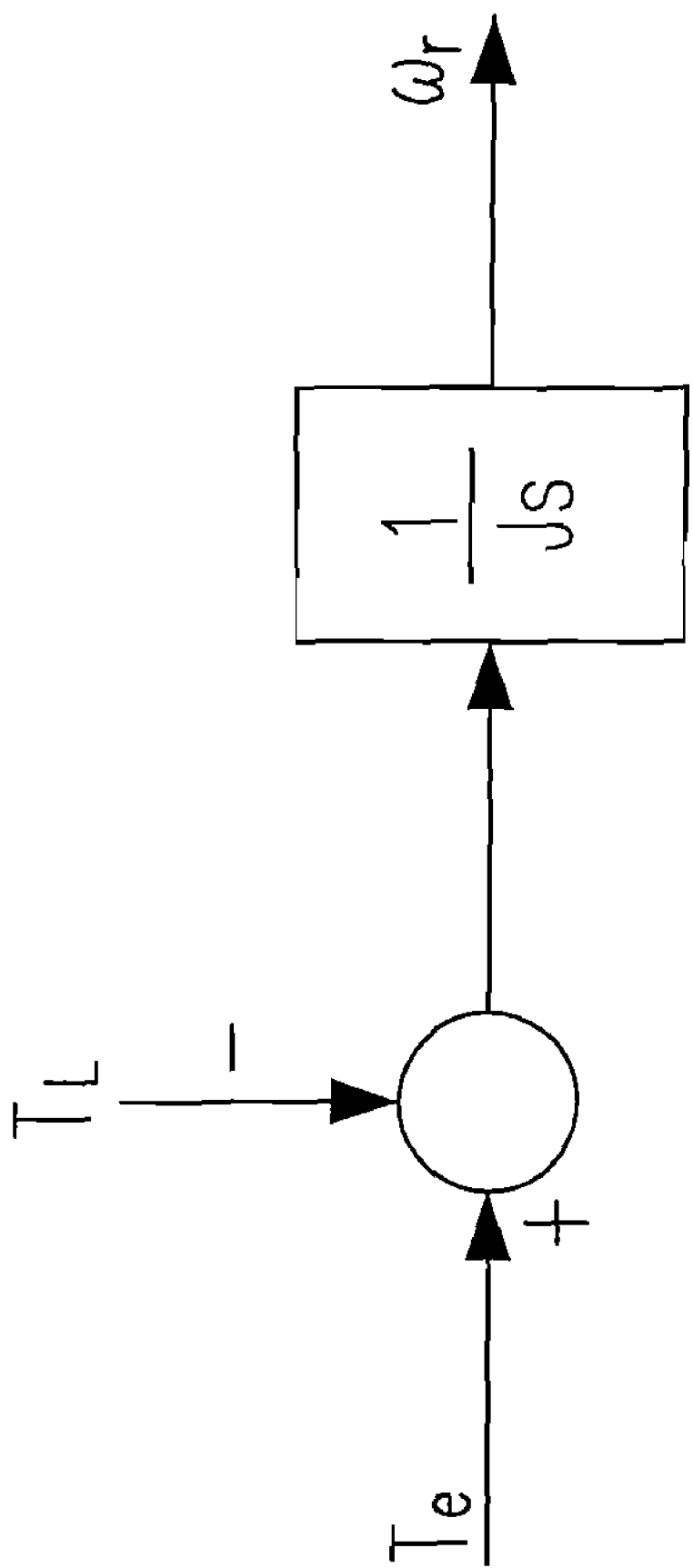
FIG. 3 is a schematic diagram showing a mechanical model of the induction motor.

The torque-speed conversion unit 20A includes a motor-mechanical conversion unit 202 and a low-pass filter 203. The motor-mechanical conversion unit 202 receives the torque difference and produces a first rotor angular speed $\omega_{r\_a}$ according to a torque-to-speed transfer function of the mechanical model of the induction motor 101 in FIG. 3. The low-pass filter 203 receives the first rotor angular speed $\omega_{r\_a}$ and emulates a transfer function between the real angular speed and the estimated rotor angular speed $\hat{\omega}_r$ produced by the speed-adaptive magnetic flux observer 120 for producing a second rotor angular speed $\omega_{r\_b}$, and the operation of the low-pass filter 203 may refer to the Documents 1 and 2 of the prior art, wherein the emulated rotor angular speed $\omega_{r\_emu}$ is equal to a summation of the second rotor angular speed $\omega_{r\_b}$ and the estimated rotor angular speed $\hat{\omega}_r$. If the slower speed response of the control system 30 can be accepted, the low-pass filter 203 may be omitted. Besides, if the slower speed response of the control system 30 can be accepted, the estimated rotor angular speed $\hat{\omega}_r$ may be assumed as zero, and under this condition, the torque-speed conversion unit 20A may not receive the estimated rotor angular speed $\hat{\omega}_r$.

The magnetizing-axis angular position emulator 322 includes a slip estimator 204, a speed limitation unit 205, and an integrator 206. The slip estimator 204 receives the estimated magnetizing current $\hat{i}_m$ and the emulated torque current $i_{sq\_emu}$ and produces the emulated slip $\omega_{slip\_emu}$ according to Equation 3 of the prior art.

The speed limitation unit 205 receives an angular speed summation of the emulated slip $\omega_{slip\_emu}$ and the emulated rotor angular speed $\omega_{r\_emu}$ for producing the feed-forward stator angular frequency command $\omega_1^*$, wherein the magnitude of the feed-forward stator angular frequency command $\omega_1^*$ is greater than a minimum of a positive angular frequency, which makes the speed-adaptive magnetic flux observer 120 run within a safety range; and the sign of the feed-forward stator angular frequency command $\omega_1^*$ may be kept and be equal to the sign of the rotor angular speed command $\omega_r^*$ or equal to the sign of the angular speed summation. Therefore, the feed-forward stator angular frequency command $\omega_1^*$ skips the condition of the zero angular frequency. Using the speed limitation unit 205, the control system 30 may be applied to the control condition the feed-forward stator angular frequency command $\omega_1^*$ has a lower value.

The integrator 206 receives the feed-forward stator angular frequency command $\omega_1^*$ and integrates the feed-forward stator angular frequency command $\omega_1^*$ for producing the feed-forward estimated magnetizing-axis angular position $\hat{\theta}_m$.

The torque current command calculator 323 includes a torque current command generator 207. The torque current command generator 207 receives the estimated magnetizing current $\hat{i}_m$ and a first slip between the feed-forward stator angular frequency command $\omega_1^*$ and the estimated rotor angular speed $\hat{\omega}_r$ and produces the torque current command $i_{sq}^*$ according to the following Equation 4.

$$i_{sq}^* = T_r \hat{i}_m \omega_{slip} \qquad \text{Equation 4}$$

wherein the slip $\omega_{slip}$ is calculated by the following Equation 5.

$$\omega_{slip} = \omega_1 - \hat{\omega}_r \qquad \text{Equation 5}$$

Figure 6:
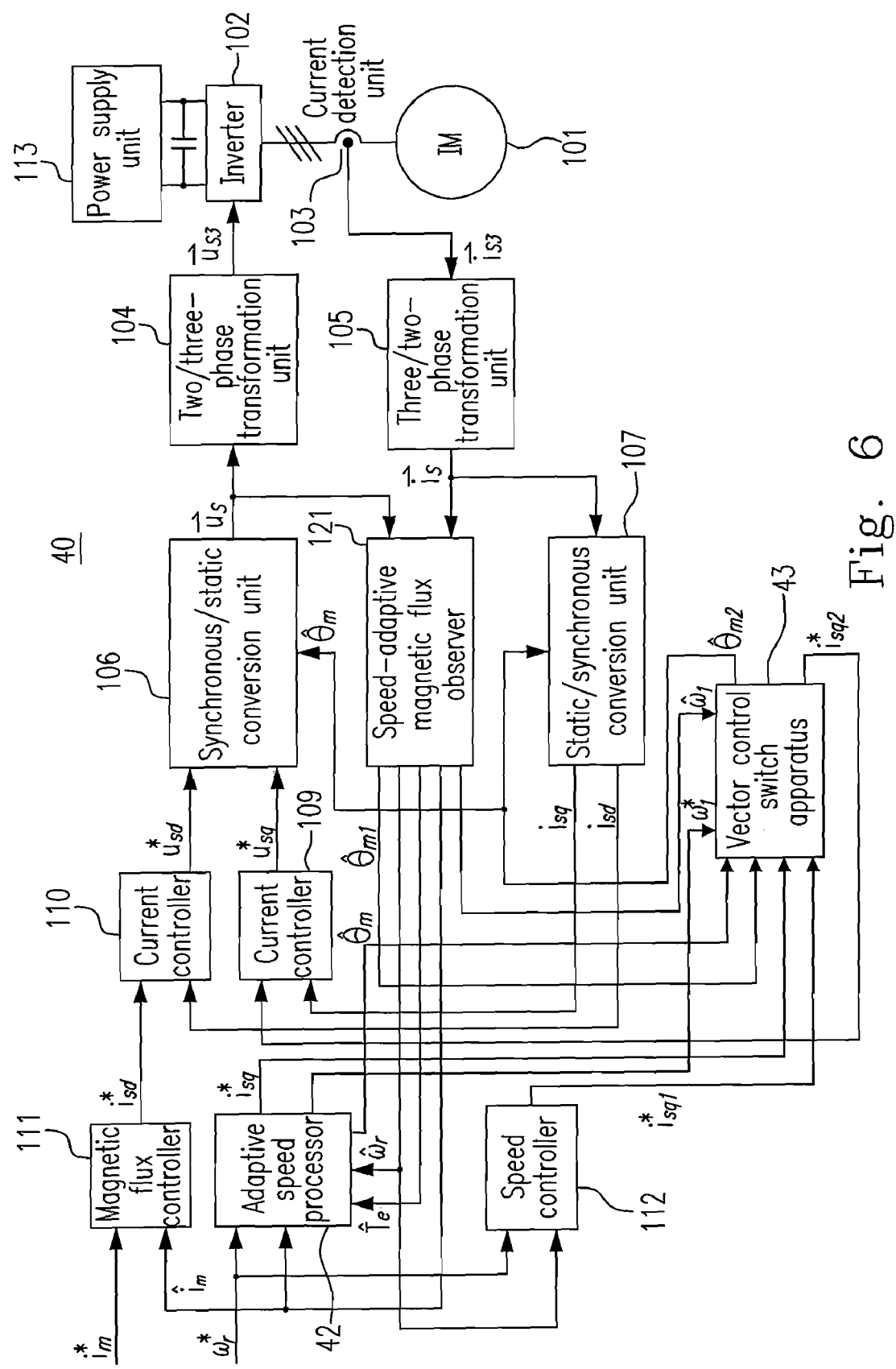
FIG. 6 is a schematic diagram showing a sensorless control system for the induction motor according to the second embodiment of the present invention.

Please refer to FIG. 6, which is a schematic diagram showing a sensorless control system for the induction motor according to the second embodiment of the present invention. The control system 40 in FIG. 6 is an expansion of the control system 30 in FIG. 4, and the repetitive descriptions below will be omitted. As shown, the sensorless control system 40 includes the power supply unit 113, the inverter 102, the induction motor 101, the current detection unit 103, the three/two-phase transformation unit 105, the two/three-phase transformation unit 104, a speed-adaptive magnetic flux observer 121, the speed controller 112, the magnetic flux controller 111, an adaptive speed processor 42, a vector control switch apparatus 43, the static/synchronous conversion unit 107, the current controller 109, the current controller 110, and the synchronous/static conversion unit 106.

The speed-adaptive magnetic flux observer 121 receives both the two-phase current $\vec{i}_s$ and the two-phase voltage us under the static reference coordinate system of the induction motor 101 and produces an estimated rotor angular speed $\hat{\omega}_r$, an estimated magnetizing current $\hat{i}_m$, an estimated electromagnetic torque $\hat{T}_e$, an estimated stator angular frequency $\hat{\omega}_1$, and an estimated magnetizing-axis angular position $\hat{\theta}_{m1}$, which are estimated properties of the induction motor 101. The speed controller 112 receives the rotor angular speed command $\omega_r^*$ and the estimated rotor angular speed $\hat{\omega}_r$ and matches the rotor angular speed command $\omega_r^*$ with the estimated rotor angular speed $\hat{\omega}_r$ for producing a torque current command $i_{sq\_1}^*$ wherein the estimated magnetizing-axis angular position $\hat{\theta}_{m1}$ and the torque current command $i_{sq\_1}^*$ are applied to the control condition the estimated stator angular frequency $\hat{\omega}_1$ has a higher value.

The magnetic flux controller 111 receives the magnetizing current command $i_m^*$ and the estimated magnetizing current $\hat{i}_m$ and matches the magnetizing current command $i_m^*$ with the estimated magnetizing current $\hat{i}_m$ for producing a magnetizing-axis current command $i_{sd}^*$. The adaptive speed processor 42 receives the rotor angular speed command $\omega_r^*$, the estimated rotor angular speed $\hat{\omega}_r$, the estimated magnetizing current $\hat{i}_m$, and the estimated electromagnetic torque $\hat{T}_e$ for producing a feed-forward stator angular frequency command $\omega_1^*$, a feed-forward estimated magnetizing-axis angular position $\hat{\theta}_m$, and a torque current command $i_{sq}^*$, wherein the feed-forward estimated magnetizing-axis angular position $\hat{\theta}_m$ and the torque current command $i_{sq}^*$ are applied to the control condition the estimated stator angular frequency $\hat{\omega}_1$ has a lower value.

The vector control switch apparatus 43 receives the torque current command $i_{sq}^*$, the torque current command $i_{sq\,1}^*$ the feed-forward estimated magnetizing-axis angular position $\hat{\theta}_m$, the estimated magnetizing-axis angular position $\hat{\theta}_{m1}$, the feed-forward stator angular frequency command $\omega_1^*$ and the estimated stator angular frequency $\hat{\omega}_1$. According to both the feed-forward stator angular frequency command $\omega_1^*$ and the estimated stator angular frequency $\hat{\omega}_1$, the switch apparatus 43 selects one of the torque current command $i_{sq}^*$ and the torque current command $i_{sq\,1}^*$ for outputting a torque current command $i_{sq\,2}^*$ and selects one of the feed-forward estimated magnetizing-axis angular position $\hat{\theta}_m$ and the estimated magnetizing-axis angular position $\hat{\theta}_{m1}$ for outputting an estimated magnetizing-axis angular position $\hat{\theta}_{m2}$. If a first stator angular frequency determined by both the feed-forward stator angular frequency command $\omega_1^*$ and the estimated stator angular frequency $\hat{\omega}_1$ is lower, the vector control switch apparatus 43 selects the torque current command $i_{sq}^*$ to be output as the torque current command $i_{sq\,2}^*$ and selects the feed-forward estimated magnetizing-axis angular position $\hat{\theta}_m$ to be output as the estimated magnetizing-axis angular position $\hat{\theta}_{m2}$. If the first stator angular frequency is higher, the vector control switch apparatus 43 selects the torque current command $i_{sq\,1}^*$ to be output as the torque current command $i_{sq\,2}^*$ and selects the estimated magnetizing-axis angular position $\hat{\theta}_{m1}$ to be output as the estimated magnetizing-axis angular position $\hat{\theta}_{m2}$.

The static/synchronous conversion unit 107 receives the two-phase current $\vec{i}_s$ and the estimated magnetizing-axis angular position $\hat{\theta}_{m2}$ and converts the two-phase current $\vec{i}_s$ under the static reference coordinate system into both a q-axis current (torque current) $i_{sq}$ and a d-axis current (magnetizing-axis current) $i_{sd}$ under the synchronous reference coordinate system of the induction motor 101 according to the estimated magnetizing-axis angular position $\hat{\theta}_{m2}$ and the static/synchronous coordinate transformation function between the static and the synchronous reference coordinate systems. The current controller 110 receives the magnetizing-axis current command $i_{sd}^*$ and the magnetizing-axis current $i_{sd}$ and matches the magnetizing-axis current command $i_{sd}^*$ with the magnetizing-axis current $i_{sd}$ for producing a magnetizing-axis voltage command $u_{sd}^*$. The current controller 109 receives the torque current command $i_{sq2}^*$ and the torque current $i_{sq}$ and matches the torque current command $i_{sq\,2}^*$ with the torque current $i_{sq}$ for producing a torque-axis voltage command $u_{sq}^*$.

The synchronous/static conversion unit 106 receives the estimated magnetizing-axis angular position $\hat{\theta}_{m2}$ and both the torque-axis voltage command $u_{sq}^*$ and the magnetizing-axis voltage command $u_{sd}^*$ under the synchronous reference coordinate system and converts both the torque-axis voltage command $u_{sq}^*$ and the magnetizing-axis voltage command $u_{sd}^*$ into the two-phase voltage $\vec{u}_s$ under the static reference coordinate system according to the estimated magnetizing-axis angular position $\hat{\theta}_{m2}$ and the synchronous/static coordinate transformation function between the synchronous and the static reference coordinate systems, wherein the torque-axis voltage command $u_{sq}^*$ and the magnetizing-axis voltage command $u_{sd}^*$ may be grouped and named as a first voltage controlling the induction motor 101.

Figure 7:
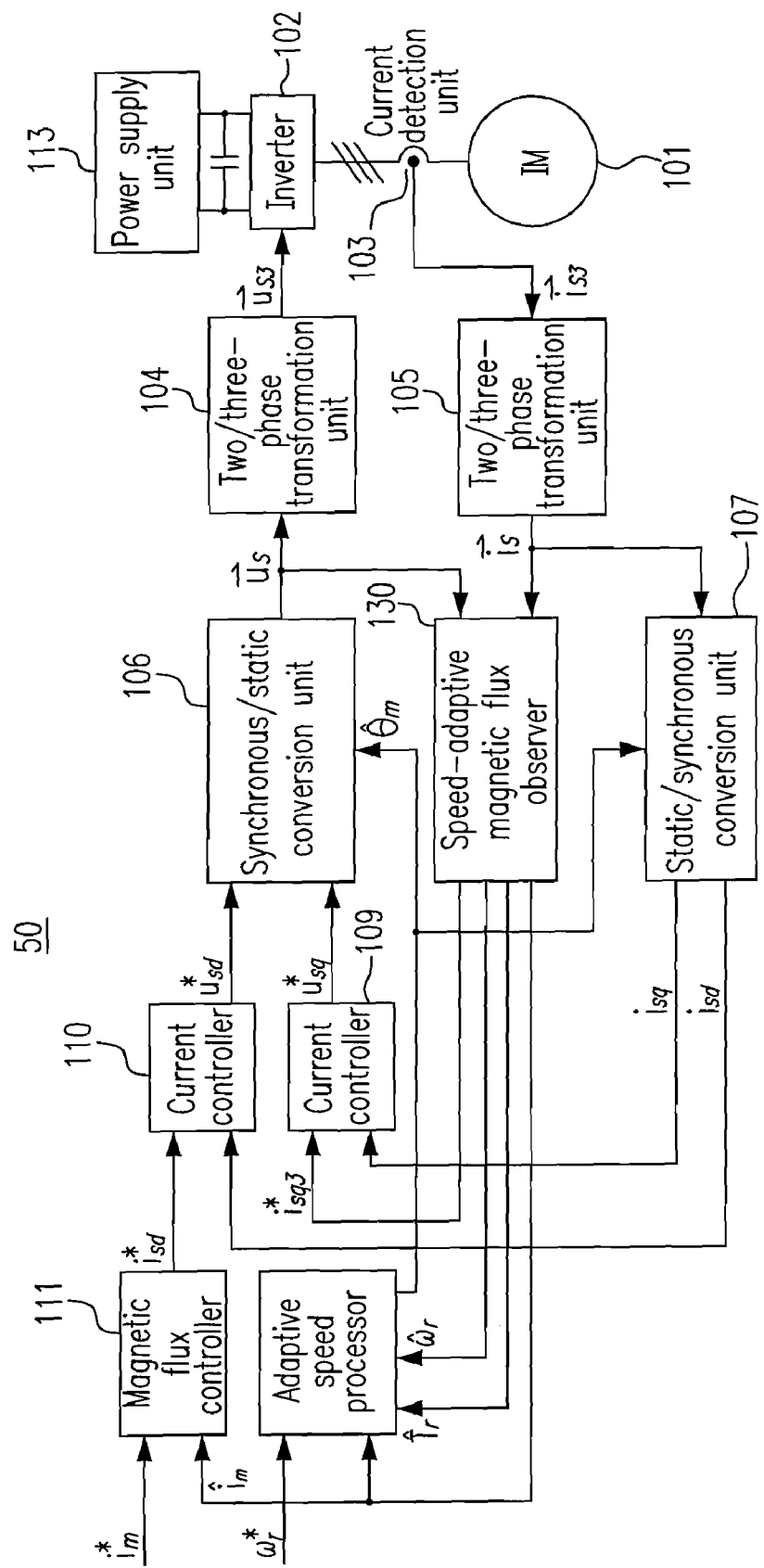
FIG. 7 is a schematic diagram showing a sensorless control system for the induction motor according to the third embodiment of the present invention.

Please refer to FIG. 7, which is a schematic diagram showing a sensorless control system for the induction motor according to the third embodiment of the present invention. The control system 50 in FIG. 7 is a deformation of the control system 30 in FIG. 4, and the repetitive descriptions below will be omitted. As shown, the sensorless control system 50 includes the power supply unit 113, the inverter 102, the induction motor 101, the current detection unit 103, the three/two-phase transformation unit 105, the two/three-phase transformation unit 104, a speed-adaptive magnetic flux observer 130, the magnetic flux controller 111, an adaptive speed processor 52, the static/synchronous conversion unit 107, the current controller 109, the current controller 110, and the synchronous/static conversion unit 106, wherein the control system 50 adopts a vector control configuration and does not use a position sensor or a speed sensor.

The speed-adaptive magnetic flux observer 130 receives both the two-phase current $\vec{i}_s$ and the two-phase voltage $\vec{u}_s$ under the static reference coordinate system of the induction motor 101, and produces an estimated rotor angular speed $\hat{\omega}_r$, an estimated magnetizing current $\hat{i}_m$, an estimated electromagnetic torque $\hat{T}_e$, which are estimated properties of the induction motor 101, and a torque current command $i_{sq\,3}^*$, wherein the torque current command $i_{sq\,3}^*$ is obtained by the following Equation 6.

$$i_{sq3}^* = \frac{i_{s\beta}\hat{i}_{m\alpha} - i_{s\alpha}\hat{i}_{m\beta}}{\hat{i}_m} \qquad \text{Equation 6}$$

The adaptive speed processor 52 receives the rotor angular speed command $\omega_r^*$ the estimated rotor angular speed $\hat{\omega}_r$, the estimated magnetizing current $\hat{i}_m$, and the estimated electromagnetic torque $\hat{T}_e$ for producing a feed-forward estimated magnetizing-axis angular position $\hat{\theta}_m$. If slower speed response of the control system 50 can be accepted, the adaptive speed processor 52 may produce the feed-forward estimated magnetizing-axis angular position $\hat{\theta}_m$ of the magnetizing flux only according to the rotor angular speed command $\omega_r^*$, the estimated magnetizing current $\hat{i}_m$, and the estimated electromagnetic torque $\hat{T}_e$, wherein the estimated rotor angular speed $\hat{\omega}_r$ is assumed to be zero. The static/synchronous conversion unit 107 receives the two-phase current $\vec{i}_s$ and the feed-forward estimated magnetizing-axis angular position $\hat{\theta}_m$ and converts the two-phase current $\vec{i}_s$ under the static reference coordinate system into both a q-axis current (torque current) $i_{sq}$ and a d-axis current (magnetizing-axis current) $i_{sd}$ under the synchronous reference coordinate system of the induction motor 101 according to the feed-forward estimated magnetizing-axis angular position $\hat{\theta}_m$ and the static/synchronous coordinate transformation function between the static and the synchronous reference coordinate systems. The current controller 109 receives the torque current command $i_{sq\,3}^*$ and the torque current $i_{sq}$ and matches the torque current command $i_{sq\,3}^*$ with the torque current $i_{sq}$ for producing a torque-axis voltage command $u_{sq}^*$.

Describing in contrast, the current controller 109 of the control system 30 in FIG. 4 receives the torque current command $i_{sq}^*$ from the adaptive speed processor 32, and Equation 4 determining the torque current command $i_{sq}^*$ is different from Equation 6 determining the torque current command $i_{sq\,3}^*$.

Figure 8:
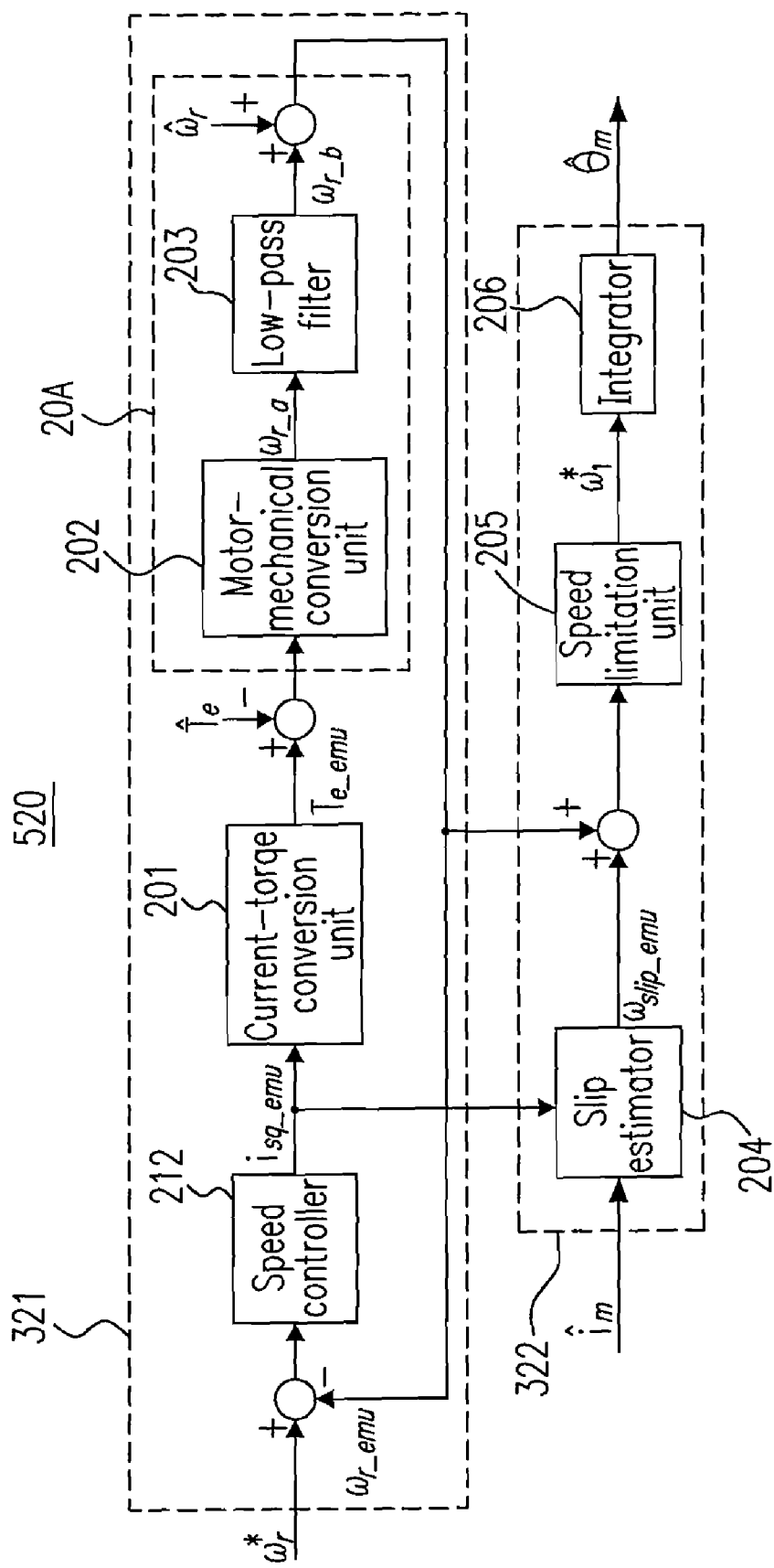
FIG. 8 is a schematic diagram showing an adaptive speed processor according to the third embodiment of the present invention.

Please refer to FIG. 8, which is a schematic diagram showing an adaptive speed processor according to the third embodiment of the present invention. The adaptive speed processor 520 in FIG. 8 is included in the adaptive speed processor 320 in FIG. 5. As shown, the adaptive speed processor 520 includes a rotating-speed locked loop 321 and a feed-forward magnetizing-axis angular position emulator 322 but does not include a torque current command calculator 323. The rotating-speed locked loop 321 and the feed-forward magnetizing-axis angular position emulator 322 are the same to those in FIG. 5, so that their description is omitted.

Figure 9:
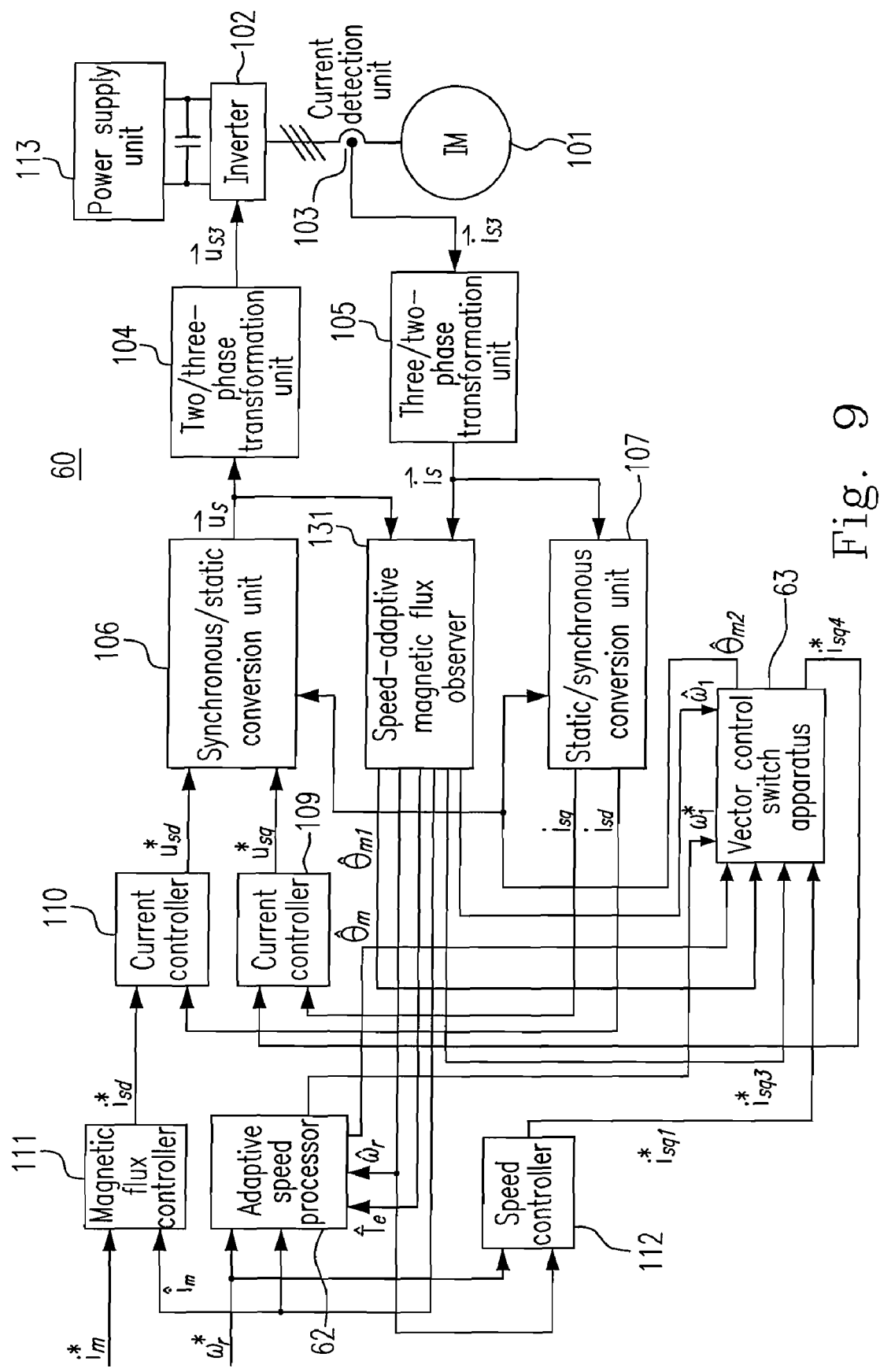
FIG. 9 is a schematic diagram showing a sensorless control system for the induction motor according to the fourth embodiment of the present invention.

Please refer to FIG. 9, which is a schematic diagram showing a sensorless control system for the induction motor according to the fourth embodiment of the present invention. The control system 60 in FIG. 9 is an expansion of the control system 50 in FIG. 7 and the repetitive descriptions below will be omitted. As shown, the sensorless control system 60 includes the power supply unit 113, the inverter 102, the induction motor 101, the current detection unit 103, the three/two-phase transformation unit 105, the two/three-phase transformation unit 104, a speed-adaptive magnetic flux observer 131, the speed controller 112, the magnetic flux controller 111, an adaptive speed processor 62, a vector control switch apparatus 63, the static/synchronous conversion unit 107, the current controller 109, the current controller 110, and the synchronous/static conversion unit 106.

The speed-adaptive magnetic flux observer 131 receives both the two-phase current $\vec{i}_s$, and the two-phase voltage $\vec{u}_s$ under the static reference coordinate system of the induction motor 101, and produces an estimated rotor angular speed $\hat{\omega}_r$, an estimated magnetizing current $\hat{i}_m$, an estimated electromagnetic torque $\hat{T}_e$, a torque current command $i_{sq\_3}^*$, an estimated stator angular frequency $\hat{\omega}_1$, and an estimated magnetizing-axis angular position $\hat{\theta}_{m1}$, which are estimated properties of the induction motor 101. The speed controller 112 receives the rotor angular speed command $\omega_r^*$ and the estimated rotor angular speed $\hat{\omega}_r$ and matches the rotor angular speed command $\omega_r^*$ with the estimated rotor angular speed $\hat{\omega}_r$ for producing a torque current command $i_{sq\_1}^*$, wherein the estimated magnetizing-axis angular position $\hat{\theta}_{m1}$ and the torque current command $i_{sq\_1}^*$ are applied to the control condition the estimated stator angular frequency $\hat{\omega}_1$ has a higher value.

The magnetic flux controller 111 receives the magnetizing current command $i_m^*$ and the estimated magnetizing current $\hat{i}_m$ and matches the magnetizing current command $i_m^*$ with the estimated magnetizing current $\hat{i}_m$ for producing a magnetizing-axis current command $i_{sd}^*$. The adaptive speed processor 62 receives the rotor angular speed command $\omega_r^*$, the estimated rotor angular speed $\hat{\omega}_r$, the estimated magnetizing current $\hat{\omega}_m$, and the estimated electromagnetic torque $\hat{T}_e$ for producing a feed-forward stator angular frequency command $\omega_1^*$ and a feed-forward estimated magnetizing-axis angular position $\hat{\theta}_m$, wherein the feed-forward estimated magnetizing-axis angular position $\hat{\theta}_m$ and the torque current command $i_{sq\_3}^*$ are applied to the control condition the estimated stator angular frequency $\hat{\omega}_1$ has a lower value.

The vector control switch apparatus 63 receives the torque current command $i_{sq3}^*$, the torque current command $i_{sq\_1}^*$, the feed-forward estimated magnetizing-axis angular position $\hat{\theta}_m$, the estimated magnetizing-axis angular position $\hat{\theta}_{m1}$, the feed-forward stator angular frequency command $\omega_1^*$, and the estimated stator angular frequency $\hat{\omega}_1$. According to both the feed-forward stator angular frequency command $\omega_1^*$ and the estimated stator angular frequency $\hat{\omega}_1$ the switch apparatus 63 selects one of the torque current command $i_{sq3}^*$ and the torque current command $i_{sq1}^*$ for outputting a torque current command $i_{sq4}^*$ and selects one of the feed-forward estimated magnetizing-axis angular position $\hat{\theta}_m$ and the estimated magnetizing-axis angular position $\hat{\theta}_{m1}$ for outputting an estimated magnetizing-axis angular position $\hat{\theta}_{m2}$. If a first stator angular frequency determined by both the feed-forward stator angular frequency command $\omega_1^*$ and the estimated stator angular frequency $\hat{\omega}_1$ is lower, the vector control switch apparatus 63 selects the torque current command $i_{sq\_3}^*$ to be output as the torque current command $i_{sq\_4}^*$ and selects the feed-forward estimated magnetizing-axis angular position $\hat{\theta}_m$ to be output as the estimated magnetizing-axis angular position $\hat{\theta}_{m2}$. If the first stator angular frequency is higher, the vector control switch apparatus 63 selects the torque current command $i_{sq\_1}^*$ to be output as the torque current command $i_{sq\_4}^*$ and selects the estimated magnetizing-axis angular position $\hat{\theta}_{m1}$ to be output as the estimated magnetizing-axis angular position $\hat{\theta}_{m2}$.

The static/synchronous conversion unit 107 receives the two-phase current $\vec{i}_s$ and the estimated magnetizing-axis angular position $\hat{\theta}_{m2}$ and converts the two-phase current $\vec{i}_s$ under the static reference coordinate system into both a q-axis current (torque current) $i_{sq}$ and a d-axis current (magnetizing-axis current) $i_{sd}$ under the synchronous reference coordinate system of the induction motor 101 according to the estimated magnetizing-axis angular position $\hat{\theta}_{m2}$ and the static/synchronous coordinate transformation function between the static and the synchronous reference coordinate systems. The current controller 110 receives the magnetizing-axis current command $i_{sd}^*$ and the magnetizing-axis current $i_{sd}$ and matches the magnetizing-axis current command $i_{sd}^*$ with the magnetizing-axis current $i_{sd}$ for producing a magnetizing-axis voltage command $u_{sd}^*$. The current controller 109 receives the torque current command $i_{sq\_4}^*$ and the torque current $i_{sq}$ and matches the torque current command $i_{sq\_4}^*$ with the torque current $i_{sq}$ for producing a torque-axis voltage command $u_{sq}^*$.

The synchronous/static conversion unit 106 receives the estimated magnetizing-axis angular position $\hat{\theta}_{m2}$ and both the torque-axis voltage command $u_{sq}^*$ and the magnetizing-axis voltage command $u_{sd}^*$ under the synchronous reference coordinate system and converts both the torque-axis voltage command $u_{sq}^*$ and the magnetizing-axis voltage command $u_{sd}^*$ into the two-phase voltage $\vec{u}_s$ under the static reference coordinate system according to the estimated magnetizing-axis angular position $\hat{\theta}_{m2}$ and the synchronous/static coordinate transformation function between the synchronous and the static reference coordinate systems.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A speed-sensorless control apparatus for an induction motor, comprising:
   a rotating-speed locked loop receiving a rotor angular speed command and an estimated electromagnetic torque of the induction motor, and emulating a speed control loop of the induction motor for producing an emulated torque current and an emulated rotor angular speed; and
   a feed-forward magnetizing-axis angular position emulator receiving the emulated torque current and the emulated rotor angular speed for producing a feed-forward estimated magnetizing-axis angular position, wherein according to the feed-forward estimated magnetizing-axis angular position, a first voltage controlling the induction motor is transformed from a synchronous reference coordinate system of the induction motor to a static reference coordinate system of the induction motor, and a two-phase current detected from the induction motor is transformed from the static reference coordinate system to the synchronous reference coordinate system.

2. A speed-sensorless control apparatus according to claim 1, wherein the rotating-speed locked loop further comprises:
   a speed controller receiving an angular speed difference between the rotor angular speed command and the emulated rotor angular speed for producing the emulated torque current;
   a current-torque conversion unit receiving the emulated torque current and producing an emulated electromagnetic torque according to a current-to-torque transfer function of the induction motor; and
   a torque-speed conversion unit receiving a torque difference between the emulated electromagnetic torque and the estimated electromagnetic torque of the induction motor, and selectively receiving an estimated rotor angular speed of the induction motor for producing the emulated rotor angular speed.

3. A speed-sensorless control apparatus according to claim 2, wherein the torque-speed conversion unit further comprises:
   a motor-mechanical conversion unit receiving the torque difference, and producing a first rotor angular speed according to a torque-to-speed transfer function of the induction motor; and
   a low-pass filter receiving the first rotor angular speed for producing a second rotor angular speed, wherein the emulated rotor angular speed is equal to a summation of the second rotor angular speed and the estimated rotor angular speed when the torque-speed conversion unit receives the estimated rotor angular speed, and the emulated rotor angular speed is equal to the second rotor angular speed when the torque-speed conversion unit does not receive the estimated rotor angular speed.

4. A speed-sensorless control apparatus according to claim 2, wherein the torque-speed conversion unit further comprises:
   a motor-mechanical conversion unit receiving the torque difference, and producing a first rotor angular speed according to a torque-to-speed transfer function of the induction motor, wherein the emulated rotor angular speed is equal to a summation of the first rotor angular speed and the estimated rotor angular speed when the torque-speed conversion unit receives the estimated rotor angular speed, and the emulated rotor angular speed is equal to the first rotor angular speed when the torque-speed conversion unit does not receive the estimated rotor angular speed.

5. A speed-sensorless control apparatus according to claim 1, wherein the feed-forward magnetizing-axis angular position emulator further comprises:
   a slip estimator receiving the emulated torque current and an estimated magnetizing current of the induction motor for producing an emulated slip;
   a speed limitation unit receiving an angular speed summation of the emulated slip and the emulated rotor angular speed for producing a feed-forward stator angular frequency command, wherein a magnitude of the feed-forward stator angular frequency command is greater than a minimum of a positive angular frequency; and
   an integrator receiving the feed-forward stator angular frequency command for producing the feed-forward estimated magnetizing-axis angular position.

6. A speed-sensorless control apparatus according to claim 1, wherein the control apparatus is a vector control apparatus without a speed sensor, the rotating-speed locked loop and the feed-forward magnetizing-axis angular position emulator constitute an adaptive speed processor, the feed-forward magnetizing-axis angular position emulator further produces a feed-forward stator angular frequency command, and the adaptive speed processor further comprises:
   a torque current command generator receiving an estimated magnetizing current of the induction motor and a first slip between the feed-forward stator angular frequency command and an estimated rotor angular speed of the induction motor for producing a torque current command.

7. A speed-sensorless control apparatus according to claim 1, wherein the feed-forward magnetizing-axis angular position emulator further produces a feed-forward stator angular frequency command, and the control apparatus further comprising:
   a torque current command generator receiving an estimated magnetizing current of the induction motor and a first slip between an estimated rotor angular speed of the induction motor and the feed-forward stator angular frequency command for producing a torque current command;
   a magnetic flux controller receiving a magnetizing current command and the estimated magnetizing current, and matching the magnetizing current command with the estimated magnetizing current for producing a magnetizing-axis current command;
   a three/two-phase transformation unit receiving a three-phase detected current of the induction motor for producing the two-phase current;
   a two/three-phase transformation unit receiving a two-phase voltage for producing a three-phase control voltage controlling the induction motor;
   a speed-adaptive magnetic flux observer receiving the two-phase current and the two-phase voltage for producing an estimated electromagnetic torque, the estimated magnetizing current, and the estimated rotor angular speed;
   a static/synchronous conversion unit receiving the feed-forward estimated magnetizing-axis angular position and the two-phase current under the static reference coordinate system for producing both a first magnetizing-axis current and a first torque current under the synchronous reference coordinate system;
   a first current controller receiving the magnetizing-axis current command and the first magnetizing-axis current, and matching the magnetizing-axis current command with the first magnetizing-axis current for producing a magnetizing-axis voltage command of the first voltage;
   a second current controller receiving the torque current command and the first torque current, and matching the torque current command with the first torque current for producing a torque-axis voltage command of the first voltage; and
   a synchronous/static conversion unit receiving the feed-forward estimated magnetizing-axis angular position and both the magnetizing-axis voltage command and the torque-axis voltage command under the synchronous reference coordinate system for producing the two-phase voltage under the static reference coordinate system.

8. A speed-sensorless control apparatus according to claim 1, further comprising:
a magnetic flux controller receiving a magnetizing current command and an estimated magnetizing current of the induction motor, and matching the magnetizing current command with the estimated magnetizing current for producing a magnetizing-axis current command;
a three/two-phase transformation unit receiving a three-phase detected current of the induction motor for producing the two-phase current;
a two/three-phase transformation unit receiving a two-phase voltage for producing a three-phase control voltage controlling the induction motor;
a speed-adaptive magnetic flux observer receiving the two-phase current and the two-phase voltage for producing an estimated electromagnetic torque, the estimated magnetizing current, and a torque current command;
a static/synchronous conversion unit receiving the feed-forward estimated magnetizing-axis angular position and the two-phase current under the static reference coordinate system for producing both a first magnetizing-axis current and a first torque current under the synchronous reference coordinate system;
a first current controller receiving the magnetizing-axis current command and the first magnetizing-axis current, and matching the magnetizing-axis current command with the first magnetizing-axis current for producing a magnetizing-axis voltage command of the first voltage;
a second current controller receiving the torque current command and the first torque current, and matching the torque current command with the first torque current for producing a torque-axis voltage command of the first voltage; and
a synchronous/static conversion unit receiving the feed-forward estimated magnetizing-axis angular position and both the magnetizing-axis voltage command and the torque-axis voltage command under the synchronous reference coordinate system for producing the two-phase voltage under the static reference coordinate system.

9. A speed-sensorless control apparatus according to claim 1, wherein the feed-forward magnetizing-axis angular position emulator further produces a feed-forward stator angular frequency command, and the control apparatus further comprising:
a torque current command generator receiving an estimated magnetizing current of the induction motor and a first slip between the feed-forward stator angular frequency command and an estimated rotor angular speed of the induction motor for producing a first torque current command;
a magnetic flux controller receiving a magnetizing current command and the estimated magnetizing current, and matching the magnetizing current command with the estimated magnetizing current for producing a magnetizing-axis current command;
a speed controller receiving the rotor angular speed command and the estimated rotor angular speed, and matching the rotor angular speed command with the estimated rotor angular speed for producing a second torque current command;
a three/two-phase transformation unit receiving a three-phase detected current of the induction motor for producing the two-phase current;
a two/three-phase transformation unit receiving a two-phase voltage for producing a three-phase control voltage controlling the induction motor;
a speed-adaptive magnetic flux observer receiving the two-phase current and the two-phase voltage for producing an estimated electromagnetic torque, the estimated magnetizing current, the estimated rotor angular speed, an estimated stator angular frequency, and a first estimated magnetizing-axis angular position;
a vector control switch apparatus receiving the first torque current command, the second torque current command, the feed-forward estimated magnetizing-axis angular position, the first estimated magnetizing-axis angular position, the feed-forward stator angular frequency command and the estimated stator angular frequency, according to both the feed-forward stator angular frequency command and the estimated stator angular frequency, selecting one of the first torque current command and the second torque current command for outputting a third torque current command, and selecting one of the feed-forward estimated magnetizing-axis angular position and the first estimated magnetizing-axis angular position for outputting a second estimated magnetizing-axis angular position;
a static/synchronous conversion unit receiving the second estimated magnetizing-axis angular position and the two-phase current under the static reference coordinate system for producing both a first magnetizing-axis current and a first torque current under the synchronous reference coordinate system;
a first current controller receiving the magnetizing-axis current command and the first magnetizing-axis current, and matching the magnetizing-axis current command with the first magnetizing-axis current for producing a magnetizing-axis voltage command of the first voltage;
a second current controller receiving the third torque current command and the first torque current, and matching the third torque current command with the first torque current for producing a torque-axis voltage command of the first voltage; and
a synchronous/static conversion unit receiving the second estimated magnetizing-axis angular position and both the magnetizing-axis voltage command and the torque-axis voltage command under the synchronous reference coordinate system for producing the two-phase voltage under the static reference coordinate system.

10. A speed-sensorless control apparatus according to claim 1, further comprising:
a magnetic flux controller receiving a magnetizing current command and an estimated magnetizing current of the induction motor, and matching the magnetizing current command with the estimated magnetizing current for producing a magnetizing-axis current command;
a three/two-phase transformation unit receiving a three-phase detected current of the induction motor for producing the two-phase current;
a two/three-phase transformation unit receiving a two-phase voltage for producing a three-phase control voltage controlling the induction motor;
a speed-adaptive magnetic flux observer receiving the two-phase current and the two-phase voltage for producing an estimated electromagnetic torque, the estimated magnetizing current, a first torque current command, an estimated rotor angular speed, an estimated stator angular frequency, and a first estimated magnetizing-axis angular position;

a speed controller receiving the rotor angular speed command and the estimated rotor angular speed, and matching the rotor angular speed command with the estimated rotor angular speed for producing a second torque current command;

a vector control switch apparatus receiving the first torque current command, the second torque current command, the feed-forward estimated magnetizing-axis angular position, the first estimated magnetizing-axis angular position, the feed-forward stator angular frequency command and the estimated stator angular frequency, according to both the feed-forward stator angular frequency command and the estimated stator angular frequency, selecting one of the first torque current command and the second torque current command for outputting a third torque current command, and selecting one of the feed-forward estimated magnetizing-axis angular position and the first estimated magnetizing-axis angular position for outputting a second estimated magnetizing-axis angular position;

a static/synchronous conversion unit receiving the second estimated magnetizing-axis angular position and the two-phase current under the static reference coordinate system for producing both a first magnetizing-axis current and a first torque current under the synchronous reference coordinate system;

a first current controller receiving the magnetizing-axis current command and the first magnetizing-axis current, and matching the magnetizing-axis current command with the first magnetizing-axis current for producing a magnetizing-axis voltage command of the first voltage;

a second current controller receiving the third torque current command and the first torque current, and matching the third torque current command with the first torque current for producing a torque-axis voltage command of the first voltage; and a synchronous/static conversion unit receiving the second estimated magnetizing-axis angular position and both the magnetizing-axis voltage command and the torque-axis voltage command under the synchronous reference coordinate system for producing the two-phase voltage under the static reference coordinate system.

11. A speed-sensorless control method for an induction motor, comprising steps of:
(a) producing an emulated torque current and an emulated rotor angular speed according to a rotor angular speed command, an estimated electromagnetic torque of the induction motor and an emulation of a speed control loop of the induction motor; and
(b) producing a feed-forward estimated magnetizing-axis angular position based on the emulated torque current and the emulated rotor angular speed, wherein according to the feed-forward estimated magnetizing-axis angular position, a first voltage controlling the induction motor is transformed from a synchronous reference coordinate system of the induction motor to a static reference coordinate system of the induction motor, and a two-phase current detected from the induction motor is transformed from the static reference coordinate system to the synchronous reference coordinate system.

12. A speed-sensorless control method according to claim 11, wherein the step (a) further comprises steps of:
producing the emulated torque current according to an angular speed difference between the rotor angular speed command and the emulated rotor angular speed;

producing an emulated electromagnetic torque according to the emulated torque current and a current-to-torque transfer function of the induction motor; and
producing the emulated rotor angular speed according to an optional estimated rotor angular speed of the induction motor and a torque difference between the emulated electromagnetic torque and the estimated electromagnetic torque.

13. A speed-sensorless control method according to claim 12, further comprising steps of:
producing a first rotor angular speed according to the torque difference and a torque-to-speed transfer function of the induction motor; and
producing a second rotor angular speed by allowing a low-frequency portion of the first rotor angular speed to pass, wherein the emulated rotor angular speed is equal to a summation of the second rotor angular speed and the estimated rotor angular speed when the estimated rotor angular speed is used, and the emulated rotor angular speed is equal to the second rotor angular speed when the estimated rotor angular speed is unused.

14. A speed-sensorless control method according to claim 12, further comprising a step of:
producing a first rotor angular speed according to the torque difference and a torque-to-speed transfer function of the induction motor, wherein the emulated rotor angular speed is equal to a summation of the first rotor angular speed and the estimated rotor angular speed when the estimated rotor angular speed is used, and the emulated rotor angular speed is equal to the first rotor angular speed when the estimated rotor angular speed is unused.

15. A speed-sensorless control method according to claim 11, wherein the step (b) further comprises steps of:
producing an emulated slip according to the emulated torque current and an estimated magnetizing current of the induction motor;
producing a feed-forward stator angular frequency command according to an angular speed summation of the emulated slip and the emulated rotor angular speed, wherein a magnitude of the feed-forward stator angular frequency command is greater than a minimum of a positive angular frequency; and
producing the feed-forward estimated magnetizing-axis angular position by integrating the feed-forward stator angular frequency command.

16. A speed-sensorless control method according to claim 11, further comprising steps of:
producing a feed-forward stator angular frequency command according to the emulated torque current and the emulated rotor angular speed;
producing a torque current command according to an estimated magnetizing current of the induction motor and a first slip between the feed-forward stator angular frequency command and an estimated rotor angular speed of the induction motor;
producing a magnetizing-axis current command by matching a magnetizing current command with the estimated magnetizing current;
producing the two-phase current by transforming a three-phase detected current of the induction motor;
producing a three-phase control voltage controlling the induction motor by transforming a two-phase voltage;
producing an estimated electromagnetic torque, the estimated magnetizing current, and the estimated rotor angular speed according to the two-phase current and the two-phase voltage;

producing both a first magnetizing-axis current and a first torque current under the synchronous reference coordinate system according to the two-phase current under the static reference coordinate system, the feed-forward estimated magnetizing-axis angular position, and a static/synchronous coordinate transformation function between the static and the synchronous reference coordinate systems;

producing a magnetizing-axis voltage command of the first voltage by matching the magnetizing-axis current command with the first magnetizing-axis current;

producing a torque-axis voltage command of the first voltage by matching the torque current command with the first torque current; and producing the two-phase voltage under the static reference coordinate system according to both the magnetizing-axis voltage command and the torque-axis voltage command under the synchronous reference coordinate system, the feed-forward estimated magnetizing-axis angular position, and a synchronous/static coordinate transformation function between the synchronous and the static reference coordinate systems.

17. A speed-sensorless control method according to claim 11, further comprising steps of:

producing a magnetizing-axis current command by matching a magnetizing current command with an estimated magnetizing current of the induction motor;

producing the two-phase current by transforming a three-phase detected current of the induction motor;

producing a three-phase control voltage controlling the induction motor by transforming a two-phase voltage;

producing an estimated electromagnetic torque, the estimated magnetizing current, and a torque current command according to the two-phase current and the two-phase voltage;

producing both a first magnetizing-axis current and a first torque current under the synchronous reference coordinate system according to the two-phase current under the static reference coordinate system, the feed-forward estimated magnetizing-axis angular position, and a static/synchronous coordinate transformation function between the static and the synchronous reference coordinate systems;

producing a magnetizing-axis voltage command of the first voltage by matching the magnetizing-axis current command with the first magnetizing-axis current;

producing a torque-axis voltage command of the first voltage by matching the torque current command with the first torque current; and producing the two-phase voltage under the static reference coordinate system according to both the magnetizing-axis voltage command and the torque-axis voltage command under the synchronous reference coordinate system, the feed-forward estimated magnetizing-axis angular position, and a synchronous/static coordinate transformation function between the synchronous and the static reference coordinate system.

18. A speed-sensorless control method according to claim 11, further comprising steps of:

producing a feed-forward stator angular frequency command according to the emulated torque current and the emulated rotor angular speed;

producing a first torque current command according to an estimated magnetizing current of the induction motor and a first slip between the feed-forward stator angular frequency command and an estimated rotor angular speed of the induction motor;

producing a magnetizing-axis current command by matching a magnetizing current command with the estimated magnetizing current;

producing a second torque current command by matching the rotor angular speed command with the estimated rotor angular speed;

producing the two-phase current by transforming a three-phase detected current of the induction motor;

producing a three-phase control voltage controlling the induction motor by transforming a two-phase voltage;

producing an estimated electromagnetic torque, the estimated magnetizing current, the estimated rotor angular speed, an estimated stator angular frequency, and a first estimated magnetizing-axis angular position according to the two-phase current and the two-phase voltage;

outputting a third torque current command by selecting one of the first torque current command and the second torque current command, and outputting a second estimated magnetizing-axis angular position by selecting one of the feed-forward estimated magnetizing-axis angular position and the first estimated magnetizing-axis angular position, according to both the feed-forward stator angular frequency command and the estimated stator angular frequency;

producing both a first magnetizing-axis current and a first torque current under the synchronous reference coordinate system according to the two-phase current under the static reference coordinate system, the second estimated magnetizing-axis angular position, and a static/synchronous coordinate transformation function between the static and the synchronous reference coordinate systems;

producing a magnetizing-axis voltage command of the first voltage by matching the magnetizing-axis current command with the first magnetizing-axis current;

producing a torque-axis voltage command of the first voltage by matching the third torque current command with the first torque current; and producing the two-phase voltage under the static reference coordinate system according to both the magnetizing-axis voltage command and the torque-axis voltage command under the synchronous reference coordinate system, the second estimated magnetizing-axis angular position, and a synchronous/static coordinate transformation function between the synchronous and the static reference coordinate systems.

19. A speed-sensorless control method according to claim 11, further comprising steps of:

producing a magnetizing-axis current command by matching a magnetizing current command with an estimated magnetizing current of the induction motor;

producing the two-phase current by transforming a three-phase detected current of the induction motor;

producing a three-phase control voltage controlling the induction motor by transforming a two-phase voltage;

producing an estimated electromagnetic torque, the estimated magnetizing current, a first torque current command, an estimated rotor angular speed, an estimated stator angular frequency, and a first estimated magnetizing-axis angular position according to the two-phase current and the two-phase voltage;

producing a second torque current command by matching the rotor angular speed command with the estimated rotor angular speed;

outputting a third torque current command by selecting one of the first torque current command and the second torque current command, and outputting a second estimated magnetizing-axis angular position by selecting one of the feed-forward estimated magnetizing-axis angular position and the first estimated magnetizing-axis angular position, according to both the feed-forward stator angular frequency command and the estimated stator angular frequency;

producing both a first magnetizing-axis current and a first torque current under the synchronous reference coordinate system according to the two-phase current under the static reference coordinate system, the second estimated magnetizing-axis angular position, and a static/synchronous coordinate transformation function between the static and the synchronous reference coordinate systems;

producing a magnetizing-axis voltage command of the first voltage by matching the magnetizing-axis current command with the first magnetizing-axis current;

producing a torque-axis voltage command of the first voltage by matching the third torque current command with the first torque current; and producing the two-phase voltage under the static reference coordinate system according to both the magnetizing-axis voltage command and the torque-axis voltage command under the synchronous reference coordinate system, the second estimated magnetizing-axis angular position, and a synchronous/static coordinate transformation function between the synchronous and the static reference coordinate systems.

20. A speed-sensorless control apparatus for an induction motor, comprising:
an adaptive speed processor including:
a rotating-speed locked loop receiving a rotor angular speed command and an estimated electromagnetic torque of the induction motor for producing an emulated torque current and an emulated rotor angular speed; and
a feed-forward magnetizing-axis angular position emulator receiving an estimated magnetizing current of the induction motor, the emulated torque current, and the emulated rotor angular speed for producing a feed-forward stator angular frequency command and a feed-forward estimated magnetizing-axis angular position, wherein according to the feed-forward estimated magnetizing-axis angular position, a first voltage controlling the induction motor is transformed from a synchronous reference coordinate system of the induction motor to a static reference coordinate system of the induction motor, and a two-phase current detected from the induction motor is transformed from the static reference coordinate system to the synchronous reference coordinate system.

* * * * *